United States Patent [19]

Ford

[11] Patent Number: 4,781,873
[45] Date of Patent: Nov. 1, 1988

[54] REVERSED PHASE MEMBRANES

[75] Inventor: Douglas L. Ford, Eastwood, Australia

[73] Assignee: Memtec Limited, New South Wales, Australia

[21] Appl. No.: 945,957

[22] PCT Filed: Mar. 6, 1986

[86] PCT No.: PCT/AU86/00054
 § 371 Date: Nov. 17, 1986
 § 102(e) Date: Nov. 17, 1986

[87] PCT Pub. No.: WO86/05707
 PCT Pub. Date: Oct. 9, 1986

[30] Foreign Application Priority Data

Mar. 28, 1985 [AU] Australia ............... PG9949

[51] Int. Cl.$^4$ ............................................. B01D 13/00
[52] U.S. Cl. ..................................... 264/44; 210/496; 210/510.1; 210/500.21; 210/500.27; 264/344
[58] Field of Search ............... 210/500.25, 496, 510, 210/505, 503; 264/DIG. 44, 44, 59, 344, 341

[56] References Cited

U.S. PATENT DOCUMENTS

| 2,474,201 | 6/1949 | Raymond et al. | 264/DIG. 44 X |
|---|---|---|---|
| 3,158,532 | 11/1964 | Pall et al. | 210/505 |
| 3,238,056 | 3/1966 | Pall et al. | 210/505 X |
| 3,573,158 | 3/1971 | Pall et al. | 210/505 X |
| 3,671,007 | 6/1972 | Bailey | 249/114 |
| 3,724,673 | 4/1973 | Ryon | 264/92 X |
| 4,473,476 | 9/1984 | McMillan | 210/653 |

Primary Examiner—Frank Spear
Attorney, Agent, or Firm—Oblon, Fisher, Spivak, McClelland & Maier

[57] ABSTRACT

A reversed phase analogue of at least part of a first membrane having substantially interconnected pores is formed by first filling at least some of the pores of the first membrane with a fluid that will form the analogue membrane and then forming the analogue membrane in the pores of the first membrane. The first membrane is then removed from the analogue membrane. The structure of the analogue membrane is of different morphology from that of the first membrane and the reversed phase nature arises because it is the pores of the first membrane which lead to the formation of the walls of the reversed phase membrane and it is the walls of the pores of the first membrane which lead to the formation of the pores of the reverse phase membrane.

12 Claims, No Drawings

REVERSED PHASE MEMBRANES

FIELD OF THE INVENTION

This invention relates to the preparation of membranes which are reversed phase analogues of porous membranes of the kind in which the pores are substantially interconnected.

BACKGROUND ART

Many useful processes are based on separations made by selective permeation through relatively thin porous membrane surfaces. The porous surfaces may be in the form of sheets, tubes or hollow fibres and many shapes and configurations are used.

The growing variety of applications for membranes arises from the fact that separation by a well-designed membrane uses only a little more than the theoretical energy minimum required by the entropy decrease due to separation. The efficiency o separation depends upon the perfection and specificity of the membrane to the application and is at its most selective in biological separations. There is, therefore, a developing need for a great variety of membrane topologies and chemistries formed from a great variety of substrates to gain selectivity, productivity and economy.

Recently, thermoplastic (and hence soluble and fusible) polymers have been widely used for the formation of membranes. Such polymers may be formed into many pore size distributions by many processes. However, the thermoplastic nature which makes initial formation of the membranes an easy task can, in some circumstances, become a disadvantage when the membrane is in use. In order to overcome the problems of heat distortion and inadequate solvent and chemical resistance, the thermoplastic polymers require cross-linking into a thermoset form.

Some thermoplastics, such as polyamides, can be cross-linked after forming but the products are still adversely affected by chlorine and hypochlorite which are used for sterilisation of the membranes.

Many of the useful cross-linked resins such as epoxy-resins, phenolic resins and polyurethanes are not available in fine porous barrier form in which the pore sizes range from 0.001 to 1 micron although coarse blown open-celled foams do exist. Similarly, fine ceramic porous barriers are limited in availability.

Although some materials such as stabilised zirconias and silicas have been formed by sintering into porous aggregates, they have not been obtained in any membrane form. Siliceous diatom skeletons occur naturally but they have not been obtainable in large, shaped forms having controlled pore size so as to be usable as a membrane.

Japanese Patent No. 55 162,466 (1981) discloses solid slurry outline coarsely-pored artefacts produced when alumina is pasted onto a necessarily compartatively large-pored polyurethane open foam which is then removed by burning. Such prior art is not directly relevant to this invention and even less relevant is the old Welsbach cerium oxide gas mantle pseudomorph artefact which is a non-reversed phase residue.

DISCLOSURE OF THE INVENTION

It is an object of the invention to provide novel porous membranes by making fluid-derived reversed phase analogues of known classes of membranes which possess substantially interconnected pores.

According to the invention there is provided a method of forming a porous membrane which is a reversed phase analogue of at least part of a first membrane the pores of which are substantially interconnected, said method comprising the steps of:

(i) filling at least some of the pcres of the first membrane with a fluid that will form the analogue membrane, (ii) forming the analogue membrane in the pores of the first membrane, and, (iii) removing the first membrane from the analogue membrane.

In accordance with the invention, all the pores of the first membrane need not be filled with the liquid and indeed the pores may be selectively filled. There is, however, a need to provide a continuity of filling throughout the membrane to keep the analogue in one piece.

The chemical characteristics of the reversed phase membrane may be varied prior to, during or sutsequent to the removal of the original membrane. Thus, hydrophilic, cross-linked phenolic, urethane and epoxy porcus membranes which hitherto were not available may now be made.

The reversed phase nature of the membrane of the invention arises because it is the pores of the first membrane which lead to the formation of the walls of the reversed phase membrane and it is the walls of the pores of the first membrane which lead to the formation of the pores of the reversed phase membrane.

The structure of the analogue membrane is of different morphology from that of the first membrane and thus the invention may be used to provide membrane structures of novel pore shape from a wide variety of materials including thermoplastic polymers.

The pores of the first membrane may be filled in a number of ways depending upon the material from which the analogue membrane is to be formed. In the case of epoxy resin analogue membranes, the analogue forming fluid will be mixed before being applied to the first membrane. Polyamide and polyurethane analogues may be formed in situ from two fluid components which react together in the pores of the first membrane, as well as by premixing the components, impregnating the first membrane and then allowing the analogue forming fluid to set. Phenolic analogues may be placed in fluid form and set by an acid gas catalyst. Silicic acid esters such as tetraethoxysilane may be partly hydrolysed before or after impregnation to form a cement comprised of submicroscopic solids in a cementing liquid as distinct from solids in a non-cementing liquid.

The analogue membrane is not a pseudomorph as is the case with the ash of wood nor is it a compaatively crude outline as is the case when solids are deposited on foam with the foam then being removed by burning and the remaining solid sintered. The impregnating fluid always forms a chemically altered second membrane and is not a simple liquid carrier or volatile solvent.

In the cases of soluble, fusible or combustible first membranes, the fluid impregnant is selected so that the reversed phase membrane will be, respectively, resistant to a solvent, infusible or will leave a coherent combustion residue. An inherent property of the first membrane can be used as the means for the removal of the first membrane. For example, if the first membrane is soluble in a particular solvent, it can be removed from the deposit of the insoluble reversed phase membrane by the action of that solvent.

The invention thus discloses whole classes of novel, cross-linked, infusible, insoluble, chemically resistant membranes previously only obtainable in soluble, fusible materials. Unusual combinations of physical, chemical, wettability and biological properties are readily achieved.

DESCRIPTION OF PREFERRED EMBODIMENTS

In examples 1 to 5, the first membrane was a 0.2 micron average pore size polypropylene porous hollow fibre of 200 microns bore and 200 microns wall thickness.

EXAMPLE 1

Equal parts of Ciba Geigy "Fast Setting Araldite" Part A containing 110% w/v liquid epoxy resin and Part B containing 101% w/v polymercaptan and 9% w/v polyamine were warmed, mixed and soaked into the fibre to replace all the air. The resin set hard in three minutes. The polypropylene walls were extracted with petroleum naphtha B.P. 180°–200° C. to leave the reversed phase epoxy resin.

The reversed phase membrane so formed was microporous, strong and hydrophilic as shown by staining red with Congo red. The pore size, as determined by an electron microscope, was around 0.1 microns and the properties of the membrane made it suitable for separating serum from blood. The surface chemistry was made more hydrophilic by heating with 0.1 normal sodium hydroxide and epichlorohydrin. The membrane was highly elastic.

EXAMPLE 2

Tetraethoxysilane was partly hydrolysed with 10N hydrochloric acid at room temperature and the polysilicate was used to impregnate the polypropylene membrane. The mass was warmed to 100° C. and then heated slowly to 300° C. There was some polypropylene smoke and a clear, colourless, rather brittle silica reversed phase membrane was formed. This was then heated to 1150° C. to sinter. The resultant reversed phase membrane was strong, colourless and porous.

EXAMPLE 3

Example 2 was repeated except that the tetraethoxysilane was mixed with soluble boron (tert. butyl borate) and aluminium (aluminium tri(isopropoxide)). The polypropylene fibre was impregnated with the mixture and then allowed to stand in moist air. The impregnated fibre was heated slowly in air, and glassy membranes were formed.

EXAMPLE 4

The preformed silica reversed phase membrane of Example 2 was heated after being dipped in N/10 sodium trialuminate to give a hard, distorted rather infusible membrane which was presumably a sodium spinel. There is no reason to doubt that the subsequent inorganic reactions of Examples 3 and 4 are the classical glass formation reactions since silica gel behaved similarly in all cases.

EXAMPLE 5

Zirconium tetrachloride (1 g) in ethanol (3 g) and calcium chloride (5 mg) was used to saturate the polypropylene membrane which was then set by holding in ammonia vapour. Slow heating of the impregnated membrane followed by ignition to the limit of the propane/air flame gave a reversed phase, somewhat distorted membrane which was brittle but perfectly porous and hydrophilic. The reversed phase membrane appeared to be a stabilised zirconia.

EXAMPLE 6

Example 1 was modified by using a nylon 6 fibre of 0.6 mm internal diameter and 1.00 mm external diameter with pores averaging 0.2 micron as the first membrane. The nylon 6 fibre was filled with the same epoxy-resin as Example 1 but removal of the polyamide was effected by soaking in 7N hydrochloric acid.

Various modifications may be made to the above methods of forming a reversed phase membrane without departing from the scope and ambit of the invention.

I claim:

1. A method of forming a porous membrane which is a reversed phase analogue of at least part of a first membrane the pores of which are substantially interconnected, said method comprising the steps of:
   (i) filling at least some of the pores of the first membrane with a fluid that will form the analogue membrane;
   (ii) forming the analogue membrane in the pores of the first membrane; and
   (iii) removing the first membrane from the analogue membrane;
   wherein said first membrane is a polypropylene or polyamide membrane and the analogue-forming liquid is at least one member selected from the group consisting of epoxy resins, silicic acid esters, phenolic resins, zirconium salts and silicon slats.

2. The method of forming a porous analogue membrane, comprising the steps of:
   (i) providing a first membrane, the pores of which are substantially interconnected;
   (ii) filling a sufficient numbers of the pores of the first membrane with a fluid that will form the analogue membrane to provide a continuity of the fluid through the first membrane;
   (iii) setting the fluid in the filled pores of the first membrane; and
   (iv) removing the first membrane from the analogue membrane whereby the pores of the first membrane define the walls of the analogue membranes and the walls of the pores of the first membrane define the pores of the analogue membrane;
   wherein said first membrane is a polypropylene or polyamide membrane and the analogue-forming liquid is at least one member selected from the group consisting of epoxy resins, silicic acid esters, phenolic resins, zirconium salts and silicon salts.

3. A method according to claim 1 or claim 2 wherein the analogue forming fluid is formed from at least two components which are mixed prior to its introduction into the pores of the first membrane.

4. A method according to claim 1 or claim 2 wherein the analogue forming fluid is formed from at least two components which are mixed in situ.

5. A method according to claim 1, wherein an inherent property of the first membrane which is not an inherent property of the analogue forming fluid is used as a means for removing the first membrane.

6. A method according to claim 1, wherein the silicic acid ester is tetraethoxysilane.

7. A method according to claim 5, wherein the tetraethoxysilane is partly hydrolyzed before or after its introduction into the pores of the first membrane.

8. A method according to claim 1, wherein the chemical characteristics of the analogue membrane are varied prior to, during or subsequent to the removal of the first membrane.

9. A method according to claim 2, wherein an inherent property of the first membrane which is not an inherent property of the analogue forming fluid is used as a means for removing the first membrane.

10. A method according to claim 2, wherein the silicic acid ester is tetraethoxysilane.

11. A method according to claim 10, wherein the tetraethoxysilane is partly hydrolyzed before or after its introduction into the pores of the first membrane.

12. A method according to claim 2, wherein the chemical characteristics of the analogue membrane are varied prior to, during or subsequent to the removal of the first membrane.

* * * * *